(12) United States Patent
Truong

(10) Patent No.: US 7,749,346 B1
(45) Date of Patent: Jul. 6, 2010

(54) DECORATIVE INLAY REPAIR METHOD

(76) Inventor: Bi C. Truong, 4324 W. 154th St., Lawndale, CA (US) 90260

( * ) Notice: Subject to any disclaimer, the term of this patent is extended or adjusted under 35 U.S.C. 154(b) by 682 days.

(21) Appl. No.: 11/694,972

(22) Filed: Mar. 31, 2007

(51) Int. Cl.
E04B 2/90 (2006.01)
E04F 13/07 (2006.01)
B32B 43/00 (2006.01)

(52) U.S. Cl. .......................................... 156/71; 156/94
(58) Field of Classification Search ................... 156/71, 156/94; 52/306–308, 311.1, 311.3, 312, 52/612, 630, 742.1, 745.08, 745.09, 745.19, 52/745.21, 746.1, 474.1, 747.12
See application file for complete search history.

(56) References Cited

U.S. PATENT DOCUMENTS

| 1,397,167 | A | * | 11/1921 | Hopper | 52/514 |
| 1,845,482 | A | * | 2/1932 | Close | 52/391 |
| 3,842,488 | A | * | 10/1974 | Mitchell | 29/527.6 |
| 4,139,667 | A | * | 2/1979 | Blue | 428/38 |
| 4,189,887 | A | * | 2/1980 | Gallant et al. | 52/169.7 |
| 4,254,077 | A | * | 3/1981 | Fontana et al. | 264/225 |
| 4,351,694 | A | * | 9/1982 | Mathis | 156/574 |
| 5,274,982 | A | * | 1/1994 | Price | 52/747.12 |
| 5,656,109 | A | * | 8/1997 | Schilling et al. | 156/63 |
| 5,660,668 | A | * | 8/1997 | Matheson et al. | 156/268 |
| 5,697,413 | A | * | 12/1997 | Fuller | 144/356 |
| 5,925,204 | A | * | 7/1999 | Hoffmann, Sr. | 156/98 |
| 6,330,774 | B1 | * | 12/2001 | Weinstein | 52/314 |
| 6,958,182 | B2 | * | 10/2005 | Hasecke et al. | 428/67 |
| 2005/0257475 | A1 | * | 11/2005 | Gong et al. | 52/506.05 |
| 2006/0003141 | A1 | * | 1/2006 | Pacione | 428/95 |
| 2008/0206509 | A1 | * | 8/2008 | Kent et al. | 428/67 |
| 2008/0229703 | A1 | * | 9/2008 | Driscoll | 52/747.1 |
| 2008/0271662 | A1 | * | 11/2008 | Driscoll et al. | 116/205 |

FOREIGN PATENT DOCUMENTS

| DE | 2155572 A | * | 11/1971 |
| DE | 3418145 A | * | 11/1985 |
| GB | 2345924 A | * | 7/2000 |
| JP | 63022965 A | * | 1/1988 |
| JP | 09078817 A | * | 3/1997 |

OTHER PUBLICATIONS

English Abstract of DE 3418145.*
English Abstract of DE 2155572.*
English Abstract of JP 63-22965.*
English Abstract of JP 09-78817.*

* cited by examiner

Primary Examiner—Philip C Tucker
Assistant Examiner—Sing P Chan

(57) ABSTRACT

A decorative inlay repair method is disclosed. An illustrative embodiment of the method includes providing a decorative inlay having a base, a plurality of adjacent bricks carried by the base and at least one decorative stone carried by the base; providing a structure having an inlay opening; and seating the decorative inlay in the inlay opening.

6 Claims, 8 Drawing Sheets

DECORATIVE INLAY REPAIR METHOD

FIELD

The present invention relates to methods of repairing structures such as walls, patios, driveways, sidewalks and the like. More particularly, the present invention relates to a decorative inlay repair method which includes repairing structures using a decorative inlay.

BACKGROUND

Over time, structures such as walls, patios, driveways, sidewalks and the like tend to crack due to weight-bearing and/or weather factors. Such structures are often repaired using repair or filler paste, concrete or masonry. However, conventional repair methods for such structures often leave unsightly results.

SUMMARY

The present invention is generally directed to a decorative inlay repair method. An illustrative embodiment of the method includes providing a decorative inlay having a base, a plurality of adjacent bricks carried by the base and at least one decorative stone carried by the base; providing a structure having an inlay opening; and seating the decorative inlay in the inlay opening.

BRIEF DESCRIPTION OF THE DRAWINGS

The invention will now be described, by way of example, with reference to the accompanying drawings, in which.

DETAILED DESCRIPTION

Figure 1:
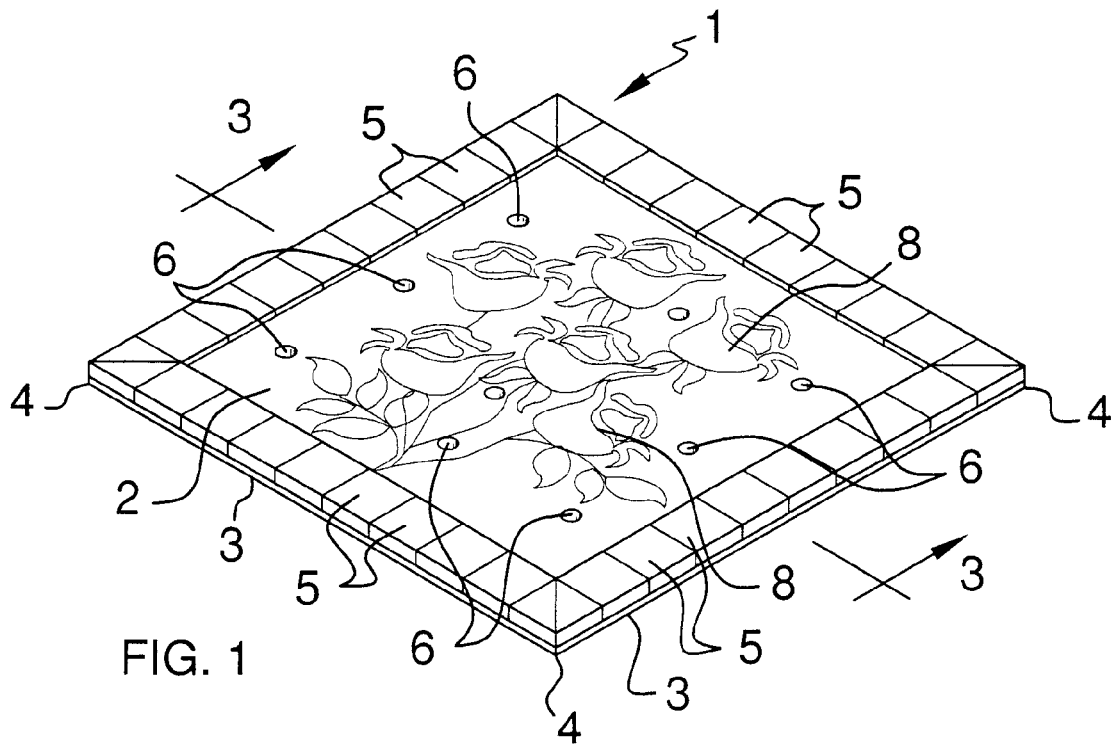
FIG. 1 is a front perspective view of an illustrative decorative inlay which is suitable for implementation of the decorative inlay repair method.
Figure 2:
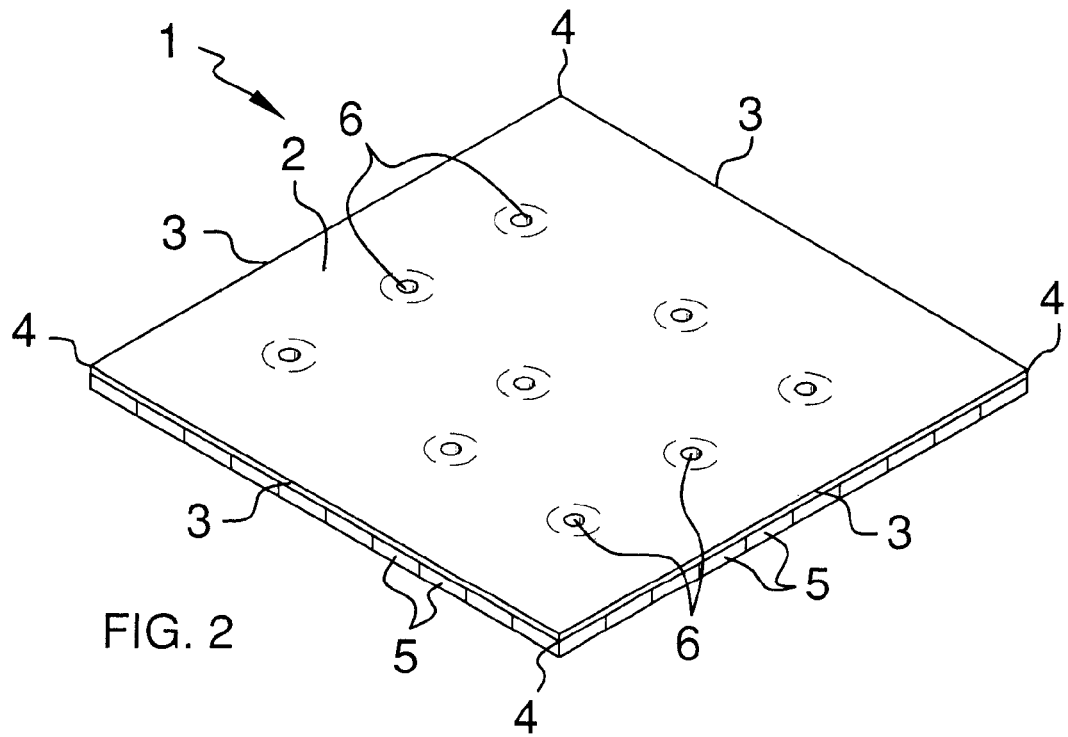
FIG. 2 is a rear perspective view of the decorative inlay.
Figure 3:
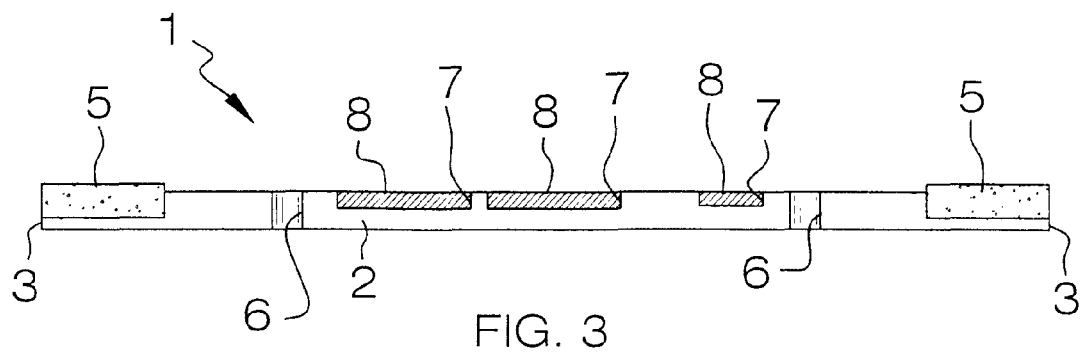
FIG. 3 is a sectional view, taken along section lines 3-3 in FIG. 1, of the decorative inlay.

Referring initially to FIGS. 1-3 of the drawings, a decorative inlay which is suitable for implementation of the decorative inlay repair method is generally indicated by reference numeral 1. The decorative inlay 1 includes a base 2 which may have a generally square or rectangular shape, as shown. Alternatively, it will be appreciated by those skilled in the art that the base 2 may have a circular, elliptical, triangular or any other shape which is consistent with the use requirements of the decorative inlay 1.

The base 2 is typically paste, concrete, mortar or the like. In embodiments in which it is square or rectangular, the base 2 has four base edges 3 and four base corners 4. In some embodiments, multiple bricks 5 are provided on the base 2 in adjacent relationship with respect to each other along the respective base edges 3 and at the respective base corners 4. Multiple fastener openings 6 may extend through the base 2 for purposes which will be hereinafter described.

At least one decorative stone 8 may be provided on the base 2. As shown in FIG. 3, in some embodiments, stone cavities 7 are provided in the base 2 and the decorative stones 8 are seated in the stone cavities 7. The decorative stones 8 may have any decorative appearance, such as the appearance of flowers, for example, as shown in FIG. 1.

Figure 4:
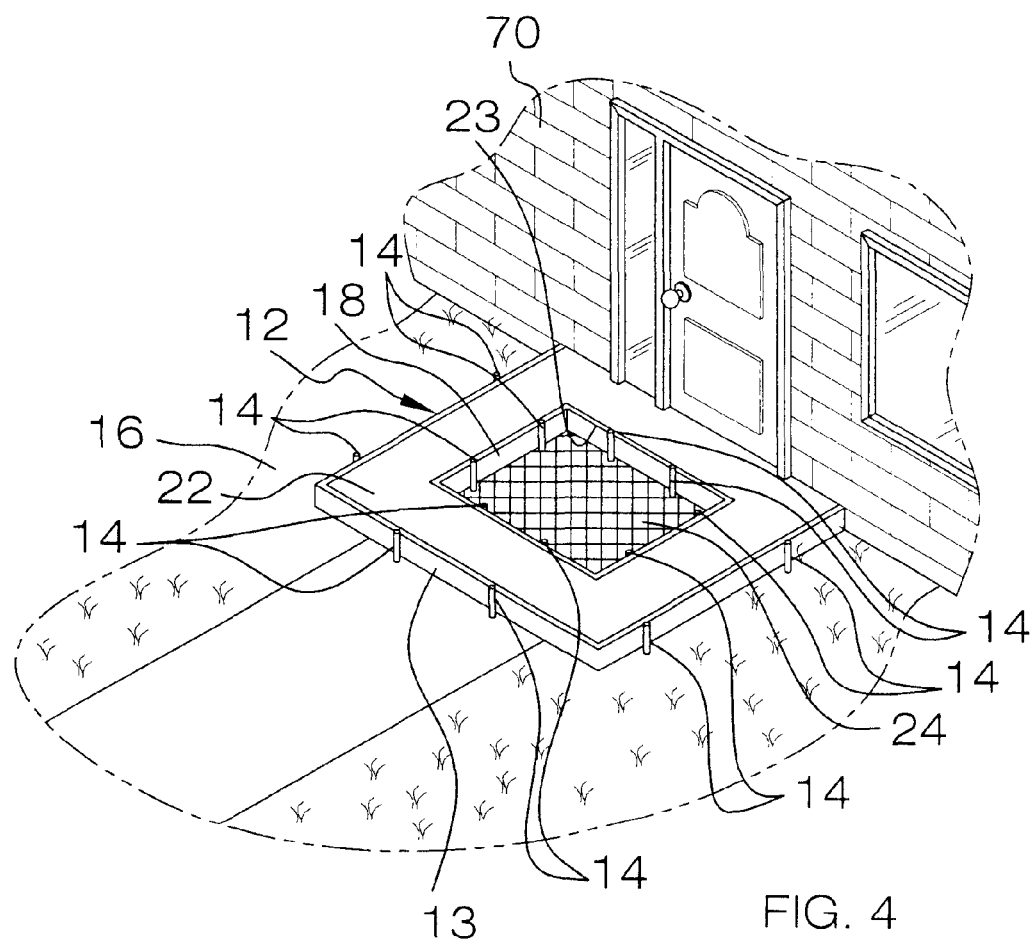
FIG. 4 is a perspective view of a new porch under construction adjacent to a house (partially in section), preparatory to placement of the decorative inlay in an inlay opening formed in the porch.
Figure 4A:
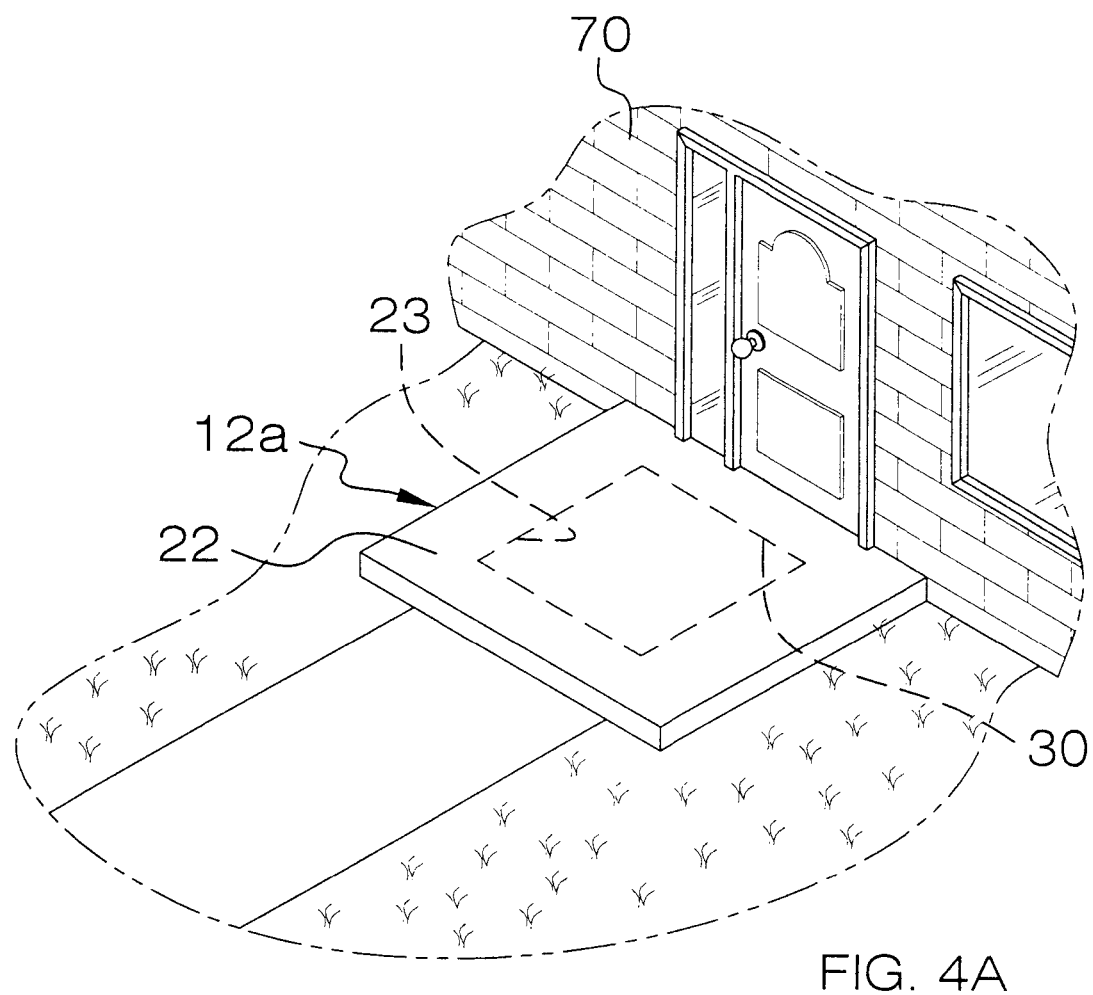
FIG. 4A is a perspective view of an existing porch adjacent to a house (partially in section), preparatory to removal of an inlay cutout (in phantom) for placement of the decorative inlay in the resulting inlay opening.
Figure 5:
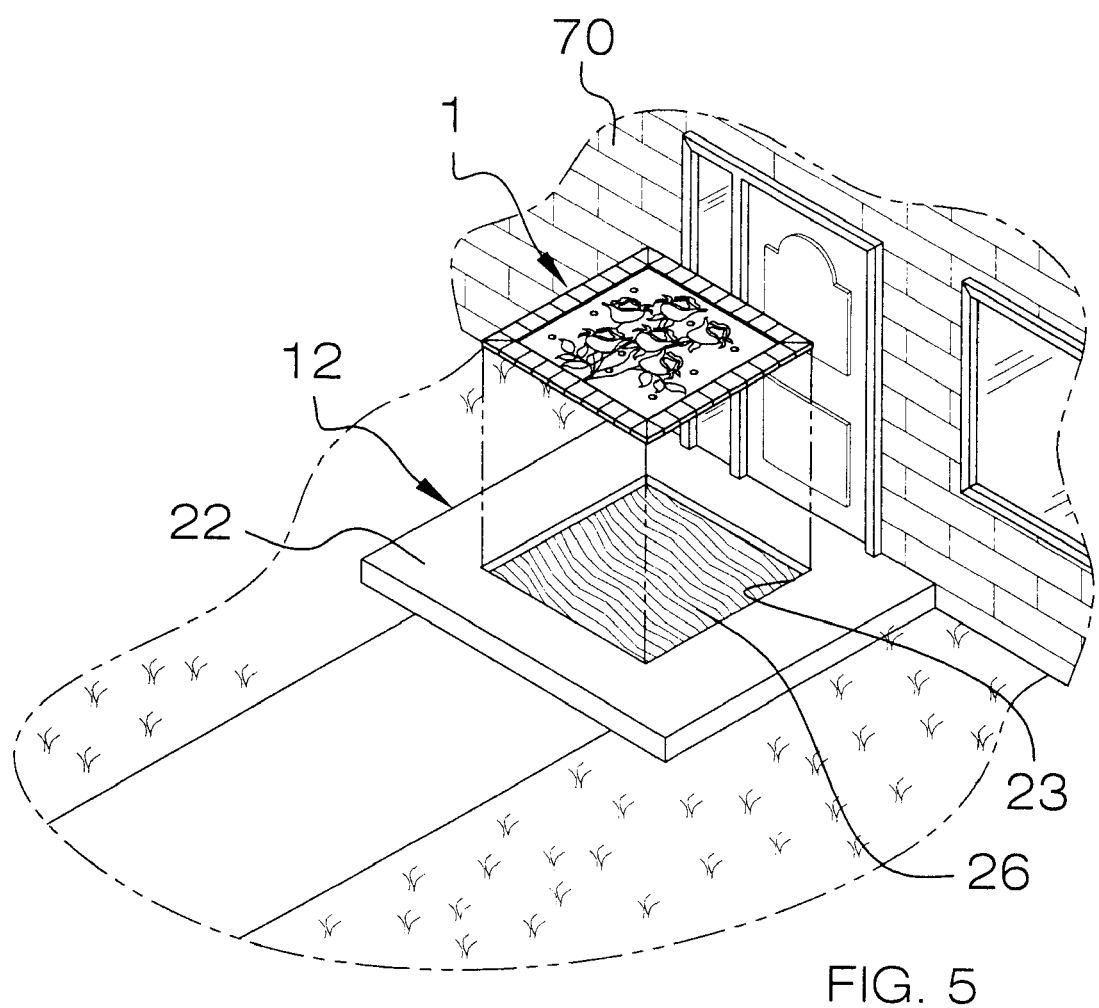
FIG. 5 is an exploded, perspective view illustrating paste provided in the inlay opening of the new porch and further illustrating placement of the decorative inlay on the paste in the inlay opening.

Referring next to FIGS. 4, 4A and 5 of the drawings, in some embodiments of the decorative inlay repair method, the decorative inlay 1 is used to decorate a new porch 12 which is shown under construction adjacent to a house 70 in FIG. 4. In other embodiments of the decorative inlay repair method, the decorative inlay 1 is used to decorate an existing porch 12a which is shown adjacent to the house 70 in FIG. 4A.

According to the embodiment of the method shown in FIGS. 4 and 5, the new porch 12 includes a porch body 22 which is typically concrete that is poured between an exterior formwork 13 and an interior formwork 18. Each of the exterior formwork 13 and the interior formwork 18 is typically supported by multiple formwork stakes 14 which extend into the ground 16 adjacent to the house 70. An inlay opening 23 is defined by the interior formwork 13. A support mesh 24 may be provided in the inlay opening 23 for reinforcing purposes.

In typical construction of the new porch 12, the exterior formwork 13 is deployed adjacent to the house 70. The interior formwork 18, having the inlay opening 23, is deployed inside the exterior formwork 13. Concrete is poured in the space between the exterior formwork 13 and the interior formwork 18 to form the porch body 22. The support mesh 24 is placed in the inlay opening 23. As shown in FIG. 5, an adhesive-type paste 26 is poured over the support mesh 24. The decorative inlay 1 is then seated on the paste 26, inside the inlay opening 23.

In embodiments in which the decorative inlay 1 is used to decorate the existing porch 12a, an inlay cutout 30 is removed from the center portion of the porch 12a to define a porch body 22 which surrounds a central inlay opening 23. The support mesh 24 (FIG. 4) is placed in the inlay opening 23, the paste 26 poured over the support mesh 24 and the decorative inlay 1 seated on the paste 26 in the inlay opening 23, respectively, as was heretofore described with respect to the new porch 12 in FIG. 4.

Figure 6:
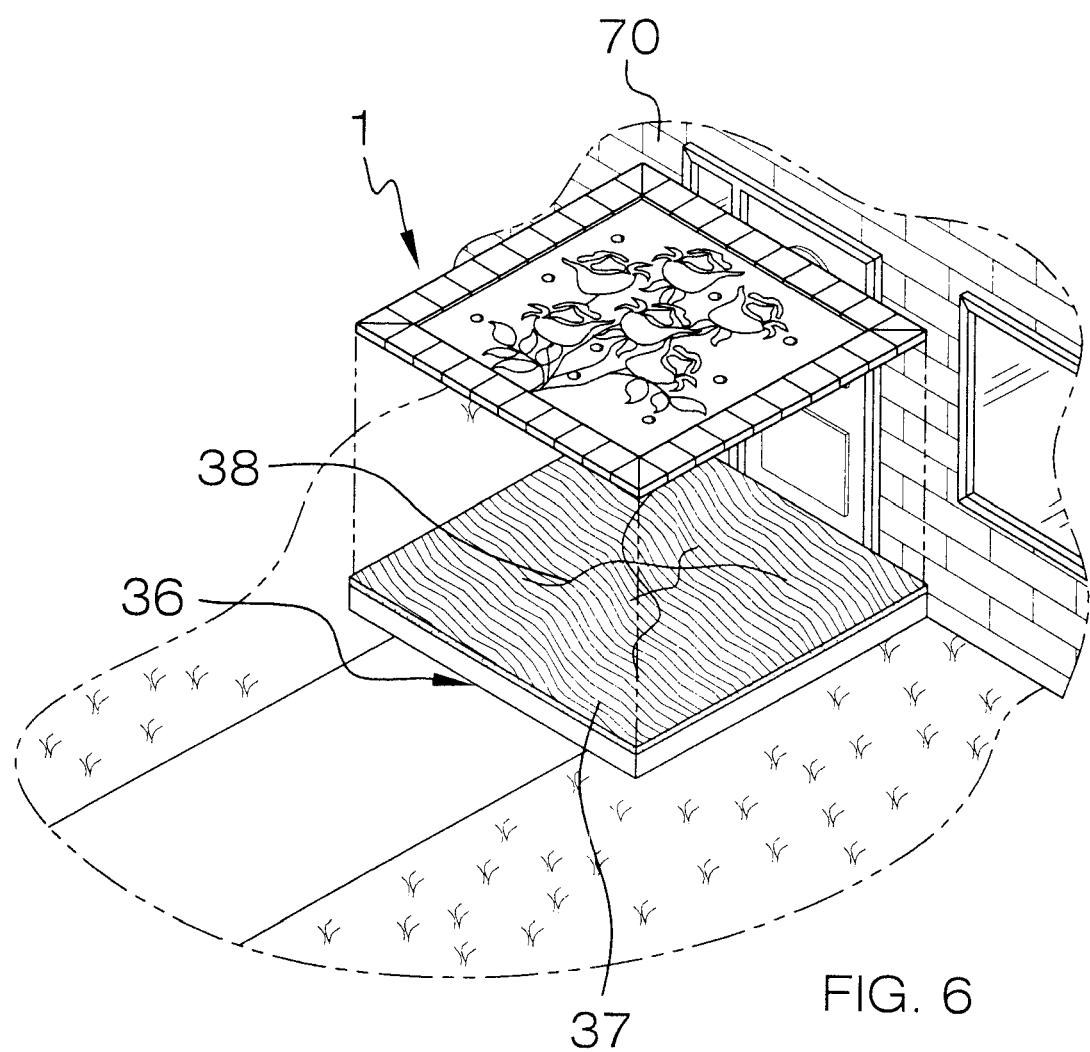
FIG. 6 is an exploded, perspective view illustrating repair of a cracked porch using the decorative inlay.
Figure 7:
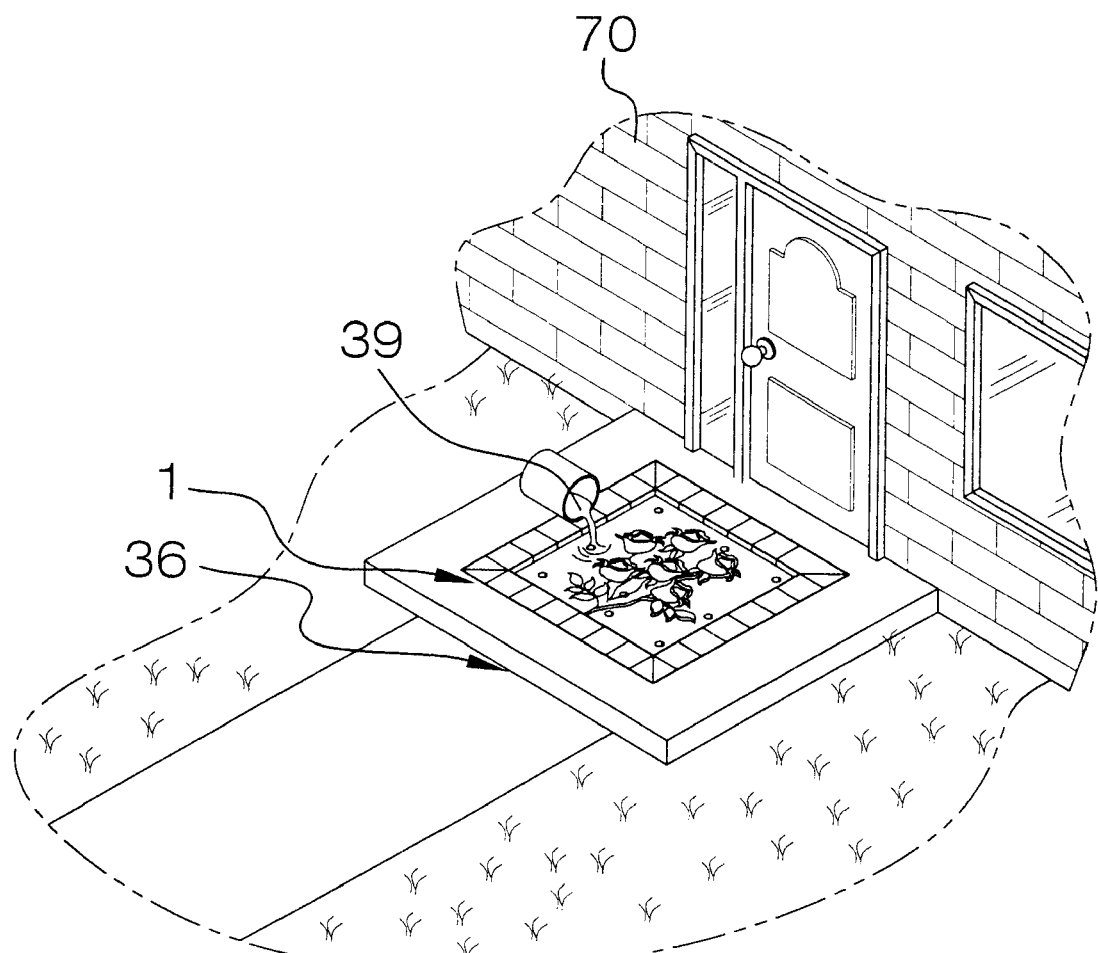
FIG. 7 is a perspective view illustrating pouring of a paste onto the decorative inlay after placement of the decorative inlay on the cracked porch.

Referring next to FIGS. 6 and 7 of the drawings, in some embodiments of the decorative inlay repair method, the decorative inlay 1 is used to repair and decorate a cracked porch 36 which typically lies adjacent to a house 70. An adhesive-type paste 37 is spread over the surface of the porch 36 in which the crack or cracks 38 appear. The decorative inlay 1 is then placed over the paste 37 to secure the decorative inlay 1 on the cracked porch 36. As shown in FIG. 7, in any embodiment of the method, a transparent finishing paste 39 is poured on the decorative inlay 1. Various colored additives (not shown) can be added to the paste 39 to enhance the colors of the decorative inlay 1, as desired.

Figure 8:
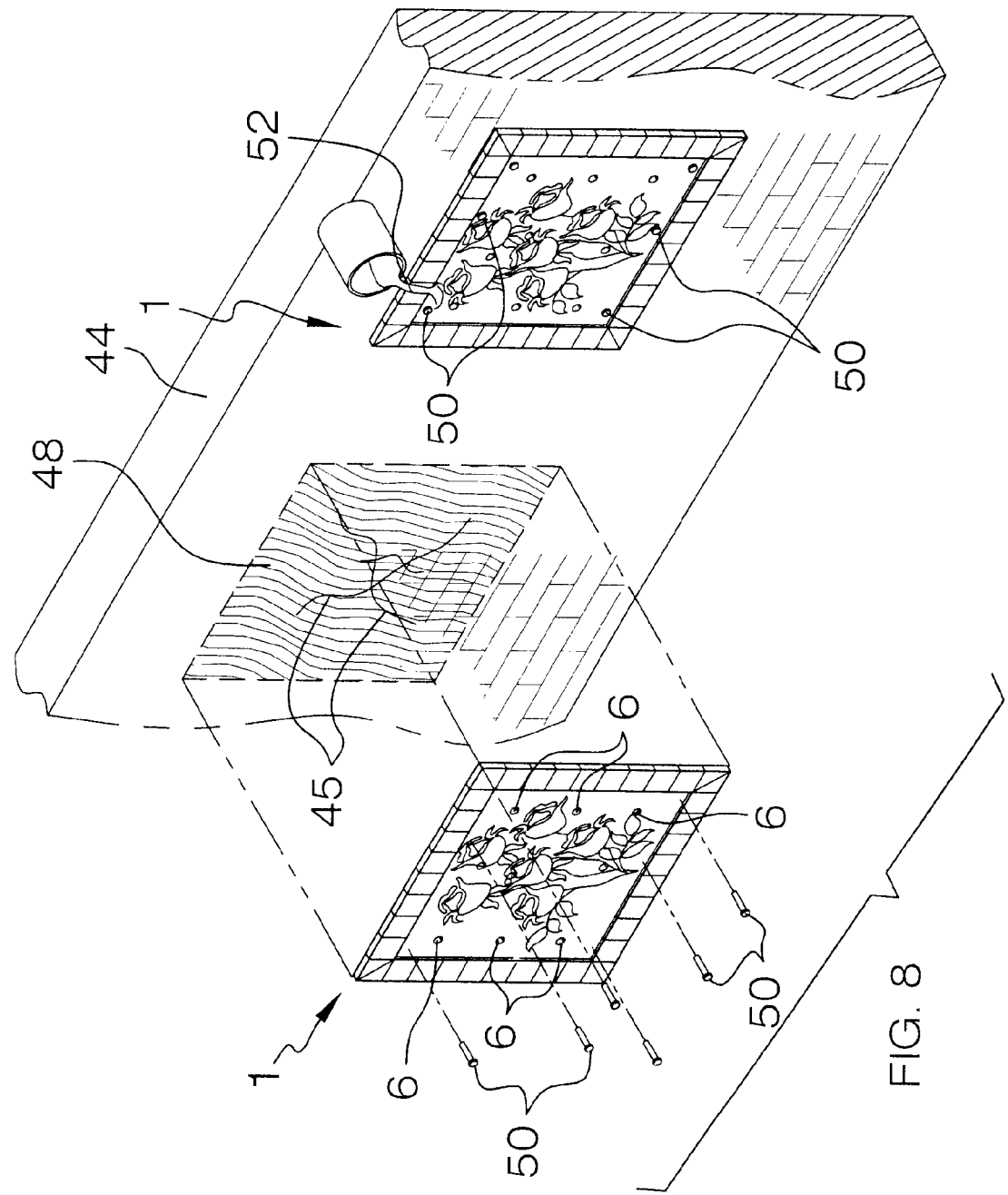
FIG. 8 is an exploded, perspective view illustrating repair of a cracked wall using the decorative inlay.

Referring next to FIG. 8 of the drawings, in some embodiments of the decorative inlay repair method, the decorative inlay 1 is used to repair a cracked wall 44. Accordingly, an adhesive-type paste 48 is spread over the surface of the wall 44 in which a crack or cracks 45 appear. The decorative inlay 1 is then pressed against the adhesive paste 48. Fasteners 50 may additionally be extended through the fastener openings 6 which extend through the base 2 and through registering fastener openings (not shown) provided in the wall 44 to secure the decorative inlay 1 against the adhesive paste 48. As further shown in FIG. 8, a transparent finishing paste 52 may be applied to the decorative inlay 1 and various colored additives (not shown) added to the finishing paste 59 to enhance the colors of the decorative inlay 1, as desired.

Figure 9:
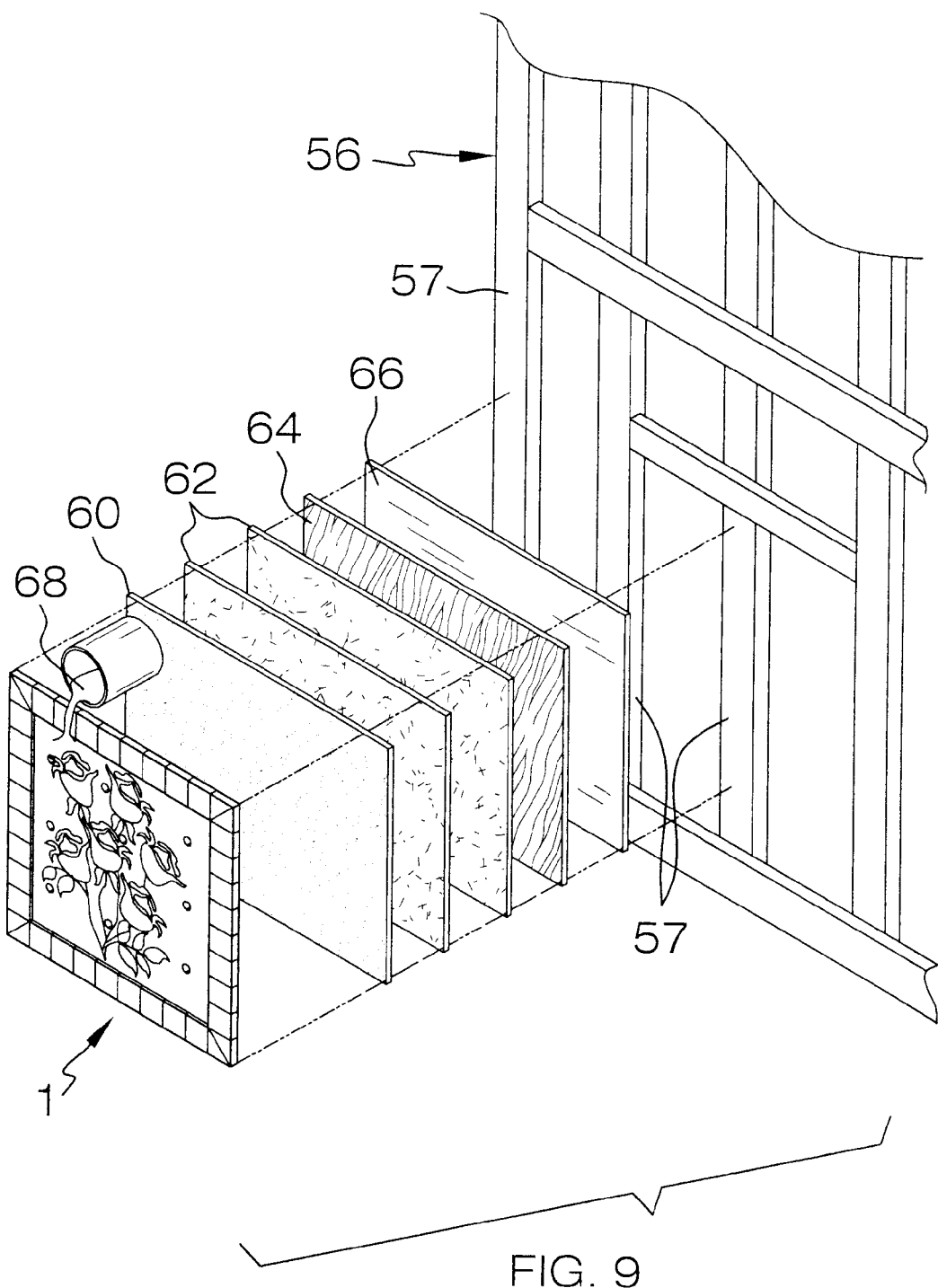
FIG. 9 is an exploded, perspective view illustrating a method of assembling the decorative inlay on a house frame.

Referring next to FIG. 9 of the drawings, in some embodiments of the decorative inlay repair method, the decorative inlay 1 is used to decorate a house frame 56 which is under construction. The house frame 56 includes multiple, parallel, spaced-apart frame members 57. A backing 66, such as paper, for example, is initially attached to the frame members 57 of the house frame 56. A support panel 64, such as plywood, for example, is provided against the backing 66. At least one layer of stucco 62 is applied to the support panel 64, after which an adhesive-type paste 60 is applied to the stucco 62. The decorative inlay 1 is applied to the paste 60. A transparent finishing paste 68 may be applied to the decorative inlay 1 and various colored additives (not shown) added to the finishing paste 68 to enhance the colors of the decorative inlay 1, as desired. During construction of the house, bricks (not shown) and/or siding (not shown) are attached to the house frame 56 around the decorative inlay 1 such that the decorative inlay 1 remains visible.

While the preferred embodiments of the invention have been described above, it will be recognized and understood that various modifications can be made in the invention and the appended claims are intended to cover all such modifications which may fall within the spirit and scope of the invention.

What is claimed is:

1. A decorative inlay repair method, comprising:
   providing a decorative inlay having a base, a plurality of adjacent bricks carried by said base and at least one decorative stone carried by said base;
   providing a plurality of fastener openings in said base and in said at least one decorative stone;
   providing a structure;
   seating said decorative inlay on said structure; and
   fastening said decorative inlay to said structure by a plurality of fasteners extended through said plurality of fastener openings.

2. The method of claim 1 wherein said structure comprises a porch or a wall.

3. The method of claim 2 further comprising cutting an inlay opening in said porch.

4. The method of claim 3 further comprising constructing a porch body around said inlay opening.

5. The method of claim 3 further comprising providing a support mesh in said inlay opening and wherein said seating said decorative inlay in said inlay opening comprises seating said decorative inlay on said support mesh.

6. The method of claim 5 wherein said seating said decorative inlay on said support mesh comprises applying an adhesive-type paste to said support mesh and seating said decorative inlay on said paste.

\* \* \* \* \*